US007555037B2

(12) United States Patent
Sedarat

(10) Patent No.: US 7,555,037 B2
(45) Date of Patent: Jun. 30, 2009

(54) METHODS AND APPARATUSES TO PROVIDE SYNCHRONIZATION SYMBOL ON DEMAND FOR DSL SYSTEMS

(75) Inventor: Hossein Sedarat, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 115 days.

(21) Appl. No.: 11/377,083

(22) Filed: Mar. 15, 2006

(65) Prior Publication Data

US 2006/0227913 A1    Oct. 12, 2006

Related U.S. Application Data

(60) Provisional application No. 60/663,297, filed on Mar. 18, 2005.

(51) Int. Cl.
  *H04L 5/16* (2006.01)
(52) U.S. Cl. ........................ 375/222; 375/219
(58) Field of Classification Search ................ 375/219, 375/220, 222, 356, 358
See application file for complete search history.

(56) References Cited

U.S. PATENT DOCUMENTS

| | | | | |
|---|---|---|---|---|
| 5,559,890 A * | 9/1996 | Obermeier et al. | .......... | 380/261 |
| 5,815,538 A * | 9/1998 | Grell et al. | .................. | 375/356 |
| 5,930,268 A * | 7/1999 | Kurby et al. | ................. | 370/509 |
| 6,014,376 A * | 1/2000 | Abreu et al. | ................. | 370/350 |
| 6,118,769 A * | 9/2000 | Pries et al. | ................... | 370/324 |
| 6,185,429 B1 * | 2/2001 | Gehrke et al. | ............... | 455/502 |
| 6,256,326 B1 * | 7/2001 | Kudo | ......................... | 370/512 |
| 6,546,025 B1 * | 4/2003 | Dupuy | ...................... | 370/509 |
| 2003/0055996 A1 * | 3/2003 | Mori et al. | ................... | 709/232 |
| 2003/0124983 A1 * | 7/2003 | Parssinen et al. | .............. | 455/69 |
| 2004/0111345 A1 * | 6/2004 | Chuang et al. | ................ | 705/35 |
| 2004/0176063 A1 * | 9/2004 | Choi | .......................... | 455/266 |
| 2004/0185852 A1 * | 9/2004 | Son et al. | ..................... | 455/438 |
| 2005/0216441 A1 * | 9/2005 | Thomas et al. | ................. | 707/1 |
| 2006/0019687 A1 * | 1/2006 | Garg et al. | ................... | 455/502 |
| 2006/0291537 A1 * | 12/2006 | Fullerton et al. | ............ | 375/145 |

OTHER PUBLICATIONS

PCT International Search Report, PCT/US06/09687, International Filing Date Mar. 16, 2006, mailed Nov. 16, 2007.
PCT Written Opinion of the International Searching Authority, PCT/US06/09687, International Filing Date Mar. 16, 2006, mailed Nov. 16, 2007.

* cited by examiner

*Primary Examiner*—Emmanuel Bayard
(74) *Attorney, Agent, or Firm*—Blakely, Sokoloff, Taylor & Zafman LLP

(57) ABSTRACT

A method and apparatus for providing synchronization data on demand are described. The method includes sending one or more synchronization parameters from a receiver to a transmitter in a data communication system, and adjusting transmission of synchronization data from a transmitter to a receiver using the one or more parameters sent by the receiver.

16 Claims, 3 Drawing Sheets

METHODS AND APPARATUSES TO PROVIDE SYNCHRONIZATION SYMBOL ON DEMAND FOR DSL SYSTEMS

RELATED APPLICATIONS

This application claims the benefit of U.S. provisional application No. 60/663,297, filed on Mar. 18, 2005.

TECHNICAL FIELD

Embodiments of the present invention relates generally to communication systems and, more particularly, to communication systems that utilize synchronization data.

BACKGROUND

In data communication systems, such as a Digital Subscriber Line (DSL) system, a burst of known data (often called synchronization data) is typically transmitted regularly in middle of data transmission. The synchronization data is typically used to adjust and tune transceiver parameters. The synchronization data may not carry useful information and is typically considered to be part of overhead. Therefore, it is desirable to transmit this data as infrequently as possible. However, because of the variation in the communication channel and also in the transceivers themselves, it is desirable to have synchronization data as frequently as possible to adapt and retrain and retune the DSL system to the current characteristics of channel and transceivers.

The rate by which synchronization data is transmitted is usually fixed during data communication. It is usually selected such that it allows fast adaptation to changes in the communication system. This results in excessive overhead if the communication system does not change rapidly. In particular, the synchronization data is often transmitted periodically with a predetermined, fixed period. This causes inefficiency in the use of resources when the change in communication system is very slow.

BRIEF DESCRIPTION OF THE DRAWINGS

One or more embodiments of the present invention are illustrated by way of example and not limitation in the figures of the accompanying drawings, in which like references indicate similar elements and in which.

DETAILED DISCUSSION

Embodiments of the present invention may relate to any communication system, and, in particular to a communication system, in which synchronization data is transmitted. A method and apparatus for adjusting the rate of transmission of synchronization data so that the transmission rate is optimal for a particular channel and a set of transceivers is described. It should be noted that the description may be given in the context of a DSL system only for ease of discussion and that it is applicable to other types of communication systems as well.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Figure 1:
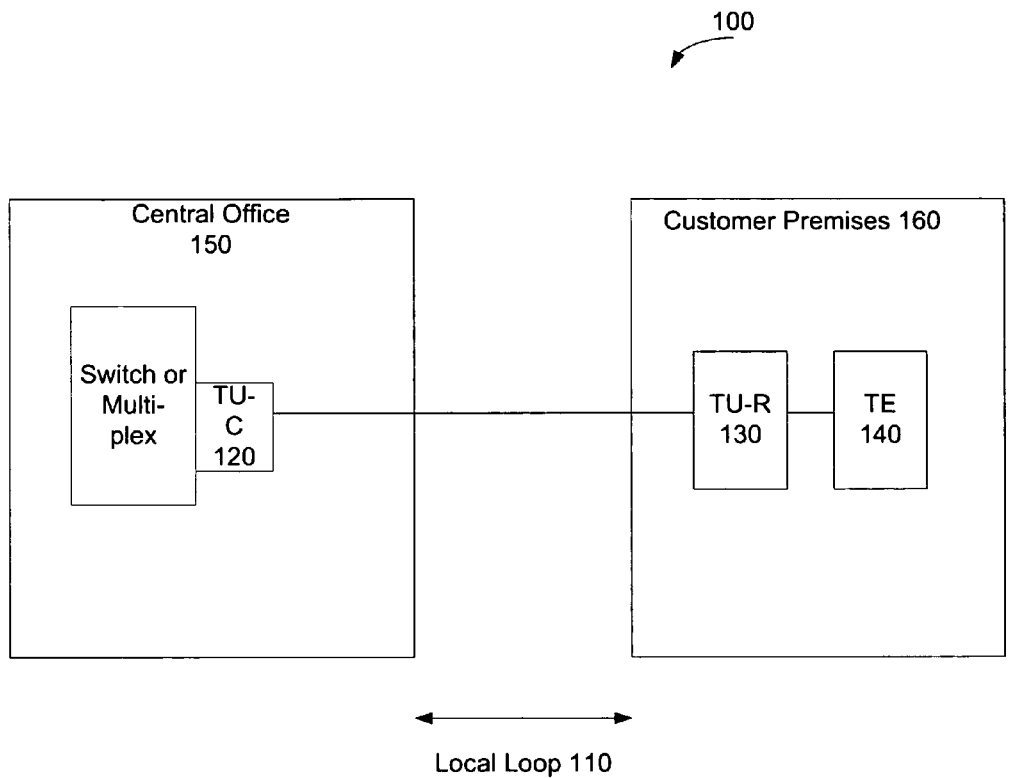
FIG. 1 illustrates a schematic diagram of an embodiment of a DSL system.

FIG. 1 shows a DSL system 100. The DSL system 100 consists of a local loop 200 110 (telephone line) with a transceiver (also known as a modem) at each end of the wires. The transceiver at the network end of the line 150 is called transmission unit at the central end (TU-C) 120. The TU-C 120 may reside within a DSL access multiplexer (DSLAM) or a digital loop 200 carrier remote terminal (DLC-RT) for lines fed from a remote site. The transceiver at the customer end 160 of the line is called transmission unit at the remote end (TU-R) 130. FIG. 1 also shows the terminal equipment 140, which is the end-user equipment, such as a personal computer or a telephone.

In DSL, data is transmitted and processed in frames. For instance in the Asymmetric Digital Subscriber Line (ADSL) standard, each frame consists of an interval of 250 microseconds. Typically, there is one synchronization frame for every 68 data frames. This overhead is fixed independent of the rate of variations in the communication channel or transceivers. There are usually logical channels in a communication system to exchange parameters between transceivers. For instance, in ADSL systems, this channel is called On Line Reconfiguration (OLR) channel.

One embodiment of a method of the present invention uses an OLR channel to set and adjust the rate and duration of the synchronization frames. In particular, in this embodiment, a synchronization frame extraction module at the receiver is coupled to a synchronization frame insertion module of the transmitter via the OLR channel. The synchronization frame extraction module at the receiver can monitor the quality of the received data and when it deems necessary, it can demand for synchronization frames.

Figure 2:
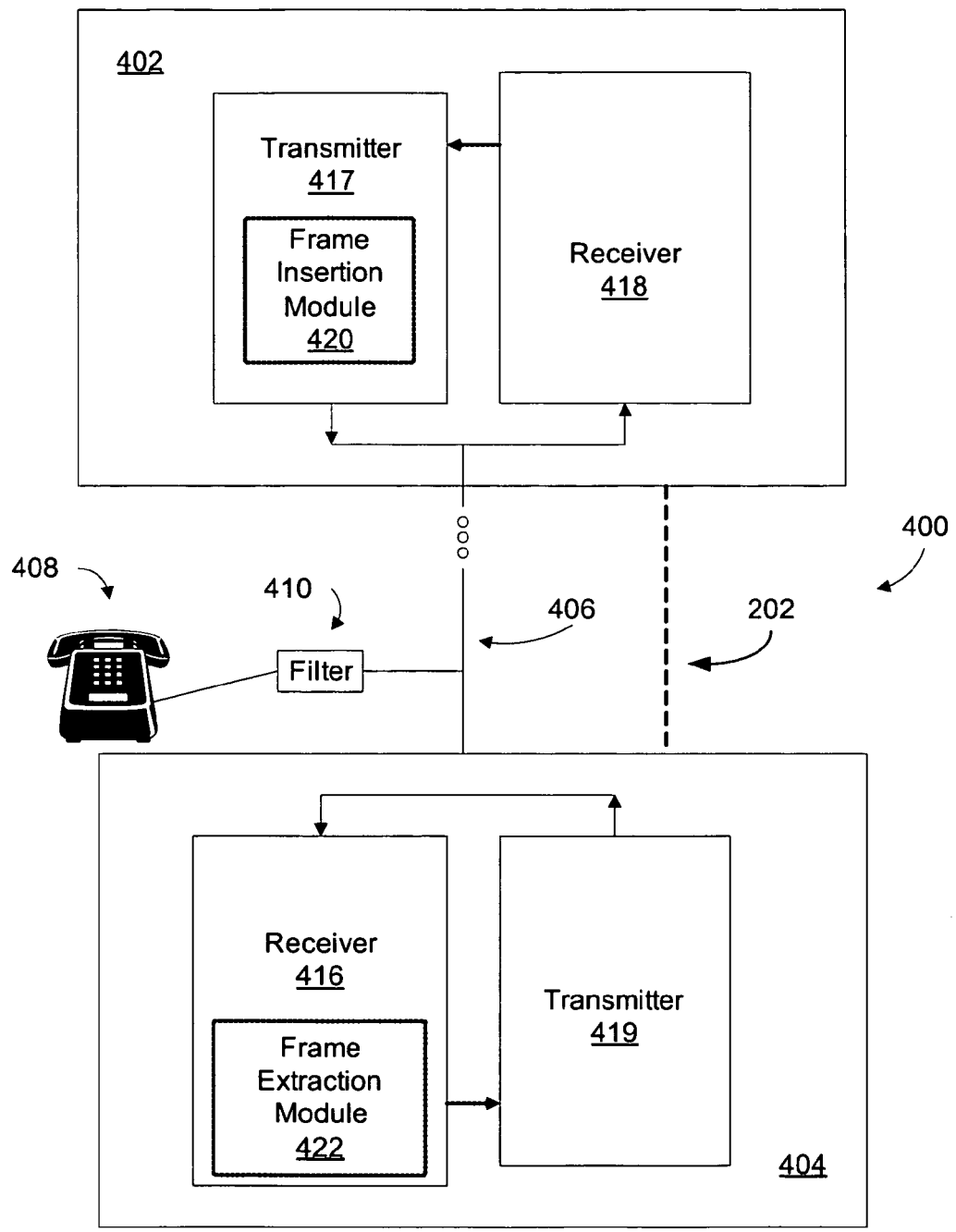
FIG. 2 illustrates a schematic diagram of a digital communication system in which an embodiment of the invention can be implemented.

The DSL system 400, shown in FIG. 2, such as a Digital Subscriber Line (DSL) based network, may have two or more transceivers 402 and 404, such as a DSL modem in a set top box. In one embodiment, the set top box may be a stand-alone DSL modem. In one embodiment, for example, the set top box employs a DSL mode along with other media components to combine television (Internet Protocol TV or Satellite) with broadband content from the Internet to bring the airwaves and the Internet to an end user's TV set. The multiple carrier communication channel may communicate a signal to a residential home. The home may have a home network, such as an Ethernet. The home network may either use the multiple carrier communication signal, directly, or convert the data from the multiple carrier communication signal. The set top box may also include an integrated Satellite and Digital Television Receiver, High-Definition Digital Video Recorder, Digital Media Server and other components.

The first transceiver 402, such as a transmitter, transmits and receives communication signals from the second transceiver 404 over a transmission medium 406, such as a telephone line. Other devices such as telephones 408 may also connect to this transmission medium 406. An isolating filter 410 generally exists between the telephone 408 and the transmission medium 406. A training period occurs when initially establishing communications between the first transceiver 402 and a second transceiver 404.

The system 400 may include a central office, multiple distribution points, and multiple end users. The central office may contain the first transceiver 402 that communicates with the second transceiver 404 at an end user's location.

Each transmitter portion 417, 419 of the transceivers 402, 404, respectively, may transmit data over a number of mutually independent sub-channels i.e., tones, e.g., in a digital multi tone (DMT) system. Each sub-channel carries only a certain portion of data through Quadrature Amplitude Modulation (QAM) of the sub-carrier. The number of information bits loaded on each tone and the size of corresponding QAM constellation may potentially vary from one tone to another and depend generally on the relative power of signal and noise at the receiver. When the characteristics of signal and noise are known for all tones, a bit-loading algorithm may determine the optimal distribution of data bits and signal power amongst sub-channels. Thus, a transmitter portion 417, 419 of the transceivers 402, 404 modulates each sub-carrier with a data point in a QAM constellation.

One or more of the transmitters 417, 419 and the receivers 418, 416 may include the components of the transmitter and receiver illustrated in FIG. 1 in the form of software and/or hardware.

Also shown in FIG. 2 is the OLR channel 202. The OLR channel 202 is a logical channel in the communication system 400 and is used to exchange parameters between transceivers 402 and 404. The OLR channel 202 is used to set and adjust the rate and duration of the frames carrying synchronization data (referred to "synchronization frames" herein). In particular, in one embodiment, a synchronization frame extraction module 422 at the receiver is coupled to a synchronization frame insertion module 420 at the transmitter via the OLR channel. The synchronization frame extraction module 422 of the receiver can monitor the quality of the received data and when it deems necessary, it can demand for synchronization frames. The synchronization frame extraction module 422 of the receiver may send synchronization parameters to the synchronization frame insertion module 420 of the transmitter to initiate or adjust the transmission of synchronization frames.

These parameters may include a frame number "N" in the future where the first synchronization frame has to be sent, a period "P" with which a synchronization frame will be sent periodically after the first one, and a duration "D" of synchronization data in terms of number of frames.

It should be noted that the operations of one or more modules may be incorporated into or integrated with other modules or may be separate from other modules. For example, monitoring of quality of received data may be performed by a module that is separate from a frame extraction module 422 that requests synchronization frames from the frame insertion module 420.

Figure 3:
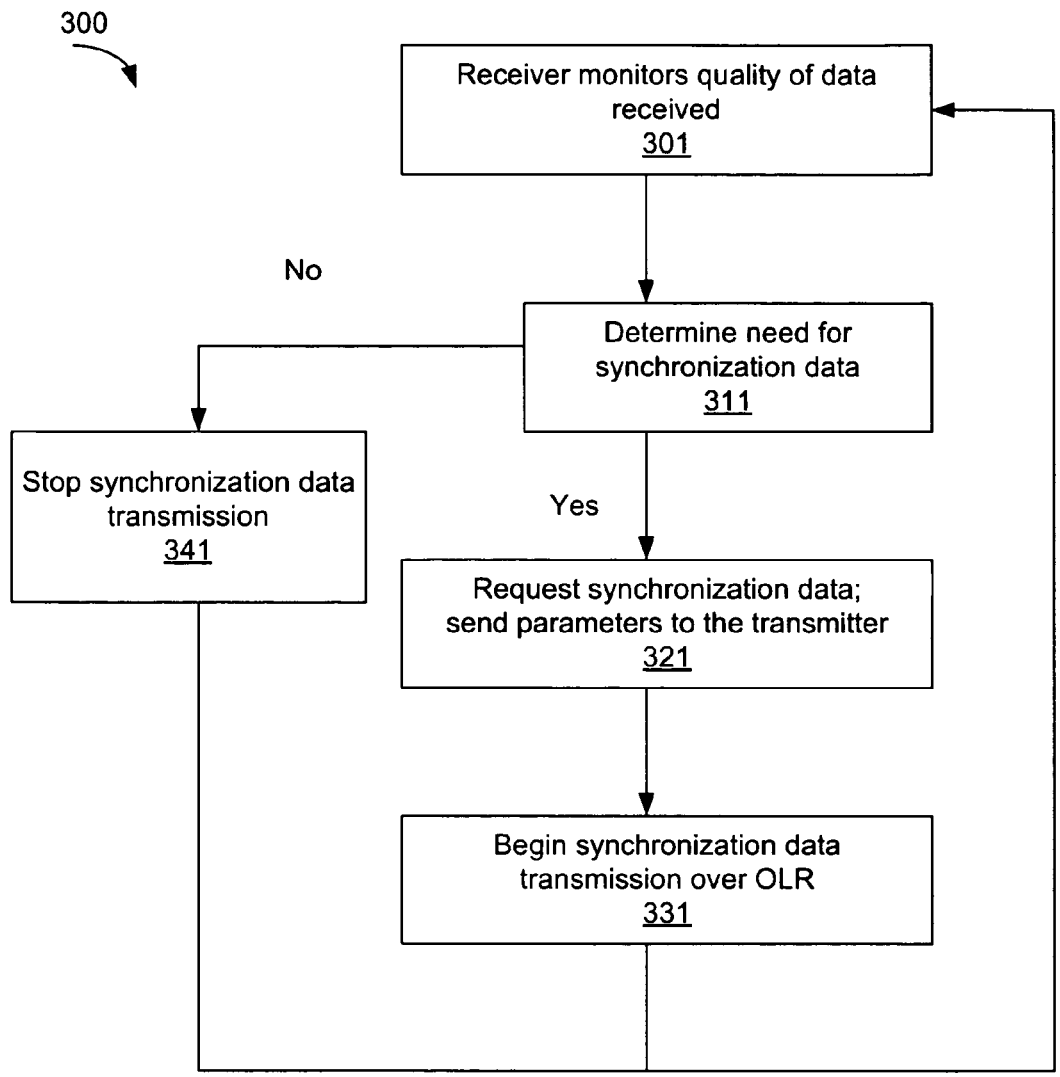
FIG. 3 illustrates a flowchart showing an embodiment of a method to provide synchronization data.

FIG. 3 illustrates an embodiment of a method 300 to adjust the rate and duration of the synchronization frames. At block 301, a DSL receiver, such as DSL receiver 416, monitors quality of data received via channel 406. At block 311, the DSL receiver, such as DSL receiver 416, determines need for synchronization frames, for instance to retrain and retune the DSL modem parameters and/or the system parameters based on the quality of the received data. At block 321, the DSL receiver, such as DSL receiver 416, requests synchronization frames. Accordingly, the DSL receiver, such as DSL receiver 416, sends parameters to the transmitter, such as DSL transmitter 417, to initiate the transmission of synchronization frames. These parameters may include a frame number "N", a period "P", and a duration "D", as discussed above. At block 331, the synchronization frames are transmitted over a logical channel, such as an OLR channel. In some embodiments, in order to synchronize the transmitter and the receiver, a frame counter at the beginning of the data transmission is reset. At block 341, if it is determined that no further synchronization frames are needed, the DSL receiver, such as DSL receiver 416, sends parameters to the transmitter, such as DSL transmitter 417, to stop the transmission of synchronization frames. For instance, the transmission of synchronization frames can be stopped by sending D=0. Further, P=0 may indicate a desire for transmission of only a single synchronization frame.

In conventional systems, the overhead of synchronization data can be excessive. With the method 300 described above, a receiver can decide how often it needs to receive synchronization data to re-adjust its parameters. Therefore, the overhead can be kept as low as necessary.

The methods described herein may be embodied on a machine-accessible medium, for example, to provide synchronization data on demand to DSL systems. A machine-accessible medium includes any mechanism that provides (e.g., stores and/or transmits) information in a form accessible by a machine (e.g., a computer). For example, a machine-accessible medium includes read only memory (ROM); random access memory (RAM); magnetic disk storage media; optical storage media; flash memory devices; DVD's, or any type of media suitable for storing electronic instructions. The data representing the apparatuses and/or methods stored on the machine-accessible medium may be used to cause the machine to perform the methods described herein.

Although the methods described herein have been shown in the form of a flow chart having separate blocks and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "coupled" as used herein may include both directly coupled and indirectly coupled through one or more intervening components.

While some specific embodiments of the invention have been shown the invention is not to be limited to these embodiments. The invention is to be understood as not limited by the specific embodiments described herein, but only by scope of the appended claims.

What is claimed is:

1. A method, comprising:
sending one or more synchronization parameters from a receiver of a transceiver to a transmitter of another transceiver in a digital subscriber line (DSL) system;
adjusting transmission of synchronization data from the transmitter of the another transceiver to the receiver of the transceiver using the one or more synchronization parameters sent by the receiver of the transceiver; and
determining a need for synchronization data at the receiver of the transceiver by monitoring a quality of non-synchronization data received at the receiver of the transceiver from the transmitter of the another transceiver.

2. The method of claim 1, wherein the one or more synchronization parameters are transmitted using an on-line reconfiguration channel.

3. The method of claim 1, wherein the one or more synchronization parameters comprise:
   a future frame number in which a first synchronization data is to be sent,
   a period with which a second synchronization data will be sent by the transmitter of the another transceiver after the first synchronization data is sent, and
   a duration of synchronization data.

4. The method of claim 1, wherein adjusting transmission of synchronization data comprises starting or stopping of transmission of synchronization data.

5. The method of claim 1, wherein the synchronization data is used to adjust parameters of the DSL system.

6. An apparatus, comprising:
   a first transceiver and a second transceiver, wherein each of the first transceiver and the second transceiver transmits and receives data in a signal over a transmission medium, comprising:
      a receiver having a synchronization data extraction module; and
      a transmitter having a synchronization data insertion module;
      wherein the synchronization data extraction module of the receiver of the first transceiver determines a need for synchronization data, and requests the synchronization data by sending one or more synchronization parameters to the synchronization data insertion module of the transmitter of the second transceiver, and the synchronization data insertion module of the transmitter of the second transceiver transmits the synchronization data to the synchronization data extraction module of the receiver of the first transceiver in response to the request for the synchronization data from the synchronization data extraction module of the receiver of the first transceiver, wherein the synchronization data is used to adjust parameters of a data communication system.

7. The apparatus recited in claim 6, wherein the one or more synchronization parameters are transmitted using an on-line reconfiguration channel.

8. The apparatus recited in claim 6, wherein the one or more synchronization parameters comprise:
   a future frame number in which a first synchronization data is to be sent;
   a period with which a second synchronization data will be sent by the transmitter after the first synchronization data is sent; and
   a duration of synchronization data.

9. The apparatus recited in claim 6, wherein the synchronization data extraction module of the first transceiver determines a need for synchronization data by monitoring a quality of non-synchronization data received at the first transceiver.

10. A set top box employing a digital subscriber line modem comprising the apparatus of claim 6.

11. A computer accessible medium to store instructions that, when accessed by a computer, cause the computer to perform operations comprising:
    sending one or more synchronization parameters from a receiver of a transceiver to a transmitter of another transceiver in a digital subscriber line (DSL) system;
    adjusting transmission of synchronization data from the transmitter of the another transceiver to the receiver of the transceiver using the one or more synchronization parameters sent by the receiver of the transceiver; and
    determining a need for synchronization data at the receiver of the transceiver by monitoring a quality of non-synchronization data received at the receiver of the transceiver from the transmitter of the another transceiver.

12. The computer accessible medium of claim 11, wherein the one or more synchronization parameters are transmitted using an on-line reconfiguration channel.

13. The computer accessible medium of claim 12, wherein the one or more synchronization parameters comprise:
    a future frame number in which a first synchronization data is to be sent;
    a period with which a second synchronization data will be sent by the transmitter of the another transceiver after the first synchronization data is sent; and
    a duration of synchronization data.

14. The computer accessible medium of claim 11, wherein adjusting transmission of synchronization data comprises starting or stopping of transmission of synchronization data.

15. The computer accessible medium of claim 11, wherein the synchronization data is used to adjust parameters of the DSL system.

16. The computer accessible medium of claim 11, wherein the computer accessible medium with instructions is included in a DSL modem.

* * * * *